Patented Nov. 1, 1927.

1,647,435

UNITED STATES PATENT OFFICE.

JOHN H. CLEWELL, JR., OF ARLINGTON, NEW JERSEY, ASSIGNOR TO E. I. DU PONT DE NEMOURS & COMPANY, OF WILMINGTON, DELAWARE, A CORPORATION OF DELAWARE.

ACTINISMPROOF CELLULOSE-ESTER COMPOSITION.

No Drawing. Application filed January 7, 1924. Serial No. 684,875.

This invention relates to cellulose ester compositions, as plastics of cellulose nitrate or acetate, and has particularly to do with an article of such plastic which is proof against the action of the sunlight, and particularly against the action of ultra-violet light, to wit, a cellulose ester plastic article which will not be deteriorated by sunlight. It is an object of the invention to provide such an article. To this end and also to improve generally upon articles of the character indicated, the invention consists in the various matters hereinafter described and claimed.

Nitrocellulose (pyroxylin) plastics are used for many purposes requiring exposure to sunlight and weather, for example in the windows of rain curtains, tops and front vizors of automobiles. In some ways they are well adapted for these uses,—they are transparent, flexible, water-proof, capable of taking a high polish, not fragile, of low specific gravity compared to glass and can be tinted or colored to any desired hue. However, nitrocellulose plastics gradually deteriorate when subjected to the continued action of direct sunlight, with first a dulling of the surface polish and a discoloration and finally development of brittleness and roughening of the surface due to formation of small surface cracks which resemble crazing of glazed pottery. This deterioration of pyroxylin plastics on exposure to sunlight shortens their life and is a serious drawback to their more extended use.

It has been found that the action of sunlight on nitrocellulose plastics is due largely to that portion of the light called ultra-violet light. This is the most active chemically and is itself invisible. Now I have found that there are certain coatings which, when applied to the surface of nitrocellulose plastics, largely protect the plastics from the ultra-violet rays and therefore reduce materially the rate at which the plastics deteriorate when exposed. For example, if these coatings are applied to a nitrocellulose plastic vizor in an automobile, the life of the vazor is more than doubled.

The protective coating must not only be resistant to sunlight but also must itself be waterproof, tough, and resistant to weather and must present when dry a hard polished surface. It should also be clear and at least nearly colorless. I prefer a good oil-resin varnish of which the following is a typical example:—copal resin, 1 part by weight; linseed oil, 1.5 to 2.5 parts by weight; spirits of turpentine, 3 to 5 parts by weight.

In preparing this varnish, the copal resin is melted at as low a temperature as possible, the hot linseed oil added and the mixture stirred continuously, while maintaining a temperature of about 210° C.; a small quantity of manganese borate may be added as a drier. After the mixture is nearly cool the turpentine is added.

A good spar varnish, such for example as "navalite," several of which are on the market, will also answer the purpose admirably. While I have found a varnish of the general character mentioned preferable, other coatings which fulfil the general conditions described above may be used. Examples of these are damar-oil varnish, various spirit varnishes, and phenol condensation product varnishes such as condensite and bakelite varnishes.

The method of applying the protective coating is immaterial; I have found spraying with a so-called air brush or atomizer to be very good although it may be applied by dipping, pouring, printing from a roll or brushing. The coating may be applied as desired, for example, over the entire surface, as to both sides of a sheet, and may be relatively thin, say 0.0005 to 0.0015 inch thick when dry.

The particular composition of the plastic per se is not of primary importance; any of the various cellulose ester plastics, containing an ester, for example nitrate or acetate, whose protection is desired may be employed. An example of cellulose nitrate plastics is pyralin. A typical formula for nitrocellulose plastic is (parts by weight):

|  | Per cent. |
|---|---|
| Nitrocellulose | 75 |
| Camphor | 23 |
| Urea | .5 |
| Residual solvent | 1.5 |

The ingredients may all be varied considerably without affecting the result. Camphor may be replaced by the so-called camphor substitutes of which examples are triphenyl phosphate, tricresyl phosphate, triacetine, ethyl acetanilid, diethyl phthalate. Urea may be replaced by other substances which will fill its function of a stabilizer.

The nitrocellulose plastics may be made by any of the usual and well-known methods. The cellulose (paper or cotton) is treated with nitric and sulphuric acids, washed, dehydrated before or after admixture of camphor or substitute, alcohol added to the mixture which is kneaded in mixing machines or on mixing rolls, pressed into a block and then sheets sliced off. Or the cellulose after nitration may be dissolved in suitable volatile solvents and cast on a metal wheel or moving belt and the film stripped after drying. In the latter case the surface is already polished, while in the former case the polish is obtained by pressing the sheets with heat between polished metal plates. The sheets may be clear and uncolored in which case they have the usual slightly yellowish color of nitrocellulose plastics, they may be tinted with blue to resemble glass color or they may be colored to any desired hue such as green, brown, blue, etc., either during or after the manufacture of the sheets.

While I have described the invention with more particular reference to nitrocellulose plastic, it will, of course, be understood that it is not restricted thereto. Other cellulosic compositions which discolor or otherwise deteriorate under the actinic rays may be similarly used; wherefor the invention includes the protection of any cellulosic plastic composition containing a substance which tends to acquire a color or to become discolored when exposed to the actinic rays of sunlight, in substantially the manner indicated. As will be understood the protective materials of the general character of those mentioned will serve for cellulose ester plastics other than cellulose nitrate plastics.

I claim:

1. A transparent pane comprising a transparent sheet of cellulose ester plastic composition of substantial thickness, and a coating on both sides thereof of transparent varnish-like material capable of absorbing those actinic rays of light which tend to induce an appreciable color change in said cellulose ester.

2. A transparent pane comprising a transparent sheet of pyroxylin plastic composition of substantial thickness, and a coating on both sides thereof of transparent, undyed, and substantially colorless, varnish-like material capable of absorbing those actinic rays of light which tend to induce an appreciable color change in said pyroxylin.

3. A transparent pane comprising a transparent sheet of pyroxylin plastic composition of substantial thickness, and a coating on both sides thereof of substantially colorless transparent oil-resin varnish.

In testimony whereof I affix my signature.

JOHN H. CLEWELL, Jr.